United States Patent [19]
Ikoh

[11] Patent Number: 5,861,985
[45] Date of Patent: Jan. 19, 1999

[54] AUTOMATIC MICROSCOPE

[75] Inventor: Chikaya Ikoh, Yokohama, Japan

[73] Assignee: Nikon Corporation, Tokyo, Japan

[21] Appl. No.: 824,183

[22] Filed: Mar. 26, 1997

Related U.S. Application Data

[63] Continuation of Ser. No. 442,778, May 17, 1995, abandoned.

[30] Foreign Application Priority Data

May 19, 1994 [JP] Japan ................................. 6-128058

[51] Int. Cl.$^6$ ................................................. G02B 21/00
[52] U.S. Cl. .......................... 359/388; 359/372; 359/384
[58] Field of Search .................................... 359/384, 388, 359/368, 369, 372, 373, 376, 381, 383–385, 308

[56] References Cited

U.S. PATENT DOCUMENTS

| | | | |
|---|---|---|---|
| 3,789,449 | 2/1974 | Reinheimer et al. | 250/201 |
| 3,790,249 | 2/1974 | Treace | 350/91 |
| 3,809,454 | 5/1974 | Brambring | 350/84 |
| 3,868,171 | 2/1975 | Hoppl | 350/85 |
| 4,202,037 | 5/1980 | Glaser et al. | 364/518 |
| 4,565,428 | 1/1986 | Arndt et al. | 350/579 |
| 5,420,716 | 5/1995 | Fukaya | 359/368 |
| 5,661,598 | 8/1997 | Tomioka | 359/388 |

FOREIGN PATENT DOCUMENTS

| | | | |
|---|---|---|---|
| 43133 | 5/1980 | European Pat. Off. | 359/382 |
| 61-172552 | 8/1986 | Japan . | |

*Primary Examiner*—Timothy P. Callahan
*Assistant Examiner*—T. T. Lam
*Attorney, Agent, or Firm*—Shapiro and Shapiro

[57] ABSTRACT

An automatic microscope comprises an operating member operated electrically, and a detector for outputting an operation signal upon detecting the presence of an observer of the microscope in a predetermined range around the microscope, thereby operating the operating member. The operating member may be a shutter for opening and closing an optical path of the optical system of the microscope, an optical path switching member for switching the optical path of the optical system, a main power switch of the microscope, an auxiliary power switch of the microscope or a power switch for an illuminating light source, and the detector may be a light reflection detector including a light source and a photosensor unit for receiving the reflected light of the light emitted from the light source.

2 Claims, 6 Drawing Sheets

AUTOMATIC MICROSCOPE

This is a continuation of application Ser. No. 08/442,778 filed May 17, 1995, now abandoned.

BACKGROUND OF THE INVENTION

1. Field of the Invention

The present invention relates to an automatic microscope.

2. Related Background Art

There has already been developed and commercialized an automatic microscope in which various operations of the microscope are conducted automatically. However, in the conventional automatic microscope, at least the first operation, such as the switching operation for the main power source, is manually executed by the observer. In recent microscopes the observer effects various operations of the microscope more frequently at the observation of the specimen. For example, for reducing the damage to the specimen by the illuminating light, the observer closes a shutter, for intercepting the light from the light source to the specimen, except during the period of observation. Conventionally, the opening and closing of shutter have been conducted by a manual operation or a switch operation. Such operation is cumbersome, and the specimen may be damaged if the operation is forgotten. Also the power source for the illuminating lamp may be turned off except for the period of observation, and the power source switch for the illuminating lamp has to be operated each time.

Also in case the observer interrupts the observation with the microscope and leaves the area, the power source switch has to be turned off each time, for power saving and for suppressing the damage to the specimen.

Also in case of measuring weak light from the specimen, stray light from the eyepiece lens significantly affects the measured value. For this reason it has conventionally been necessary to cover the eyepiece lens with a cap or to operate a manual or electric shutter.

Also in the microscope equipped with a television camera, a light measuring sensor, a phototaking camera or the like, there are provided an optical path for guiding light from the specimen to such equipment and an optical path for guiding light to an eyepiece lens barrel, and there is required an operation for switching the optical path at each observation through the eyepiece lens barrel.

SUMMARY OF THE INVENTION

In consideration of the foregoing, the object of the present invention is to provide an automatic microscope enabling the observation of the specimen in satisfactory condition and also enabling electric power saving and saving of labor by the observer, even if the observer intentionally omits the operations of the microscope.

The above-mentioned object can be attained, according to the present invention, by an automatic microscope comprising:

an operation member operated electrically;

a detector for outputting a first signal upon detecting the presence of an observer for the microscope in a predetermined area around the microscope, and a second signal, different from said first signal, in the absence of such detection; and a control circuit for controlling the operation of said operation member according to said first and second signals outputted from said detector.

According to the present invention, the operation member of the microscope is operated automatically when the detector detects the observer of the microscope, present in a predetermined range.

It is also possible to detect the movement of the observer of the microscope in more precise manner, by providing plural detectors in mutually different positions of the microscope and to cause the control circuit to control the function of said operation member according to a combination of the respective first and second signals outputted from said plural detectors.

DESCRIPTION OF THE PREFERRED EMBODIMENTS

Figure 1:
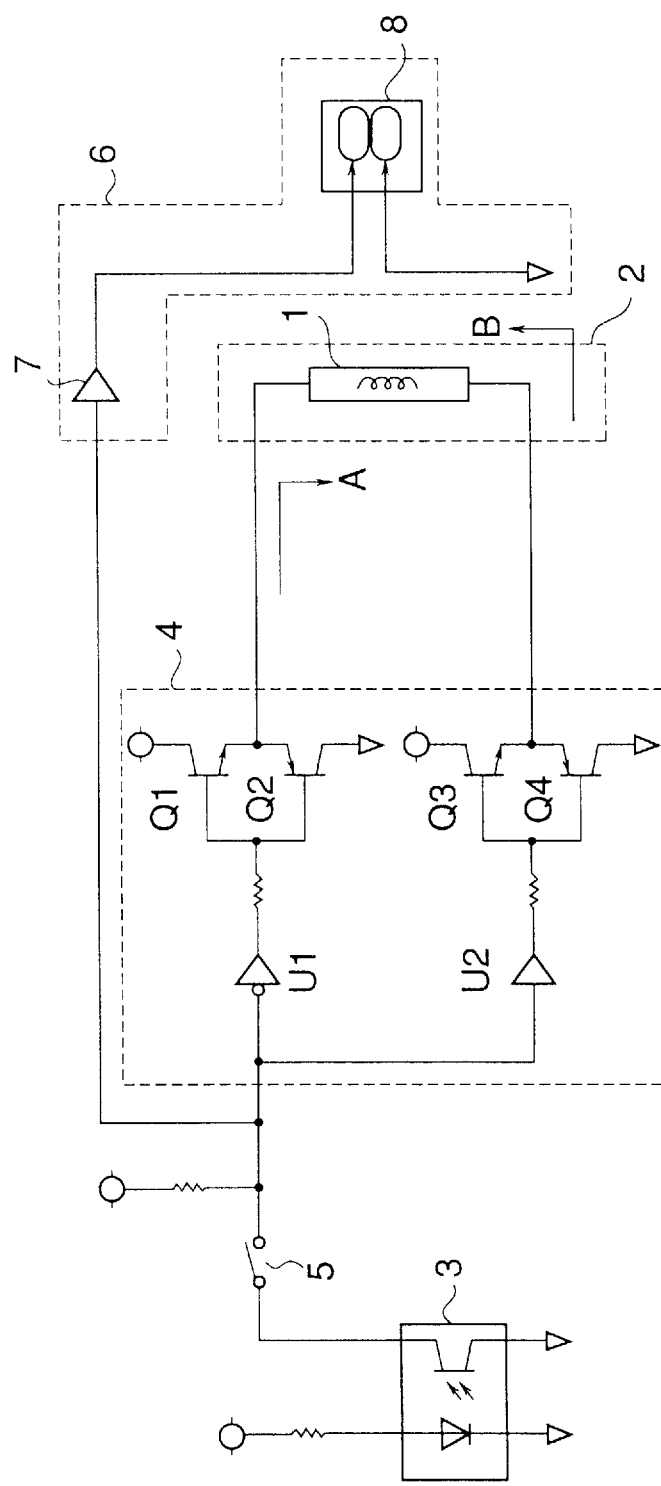
FIG. 1 is a block diagram of a first embodiment of the present invention.

Now a first embodiment of the present invention will be explained with reference to FIG. 1.

A shutter 1, constituting an operation unit 2, opens an optical path of an illuminating optical system for guiding the illuminating light to a specimen, when a current flows in a direction A, and closes said optical path when a current flows in a direction B. A reflected light sensor 3 outputs a detection signal upon detecting the presence of an observer within a predetermined detection range. A control unit 4 is composed of transistors Q1, Q2 connected to an inverter U1, and transistors Q3, Q4 connected to a buffer U2. Between the sensor 3 and the control unit 4, there is provided a switch 5, and there is branched a signal output unit 6, composed of a buffer 7 and a connector 8.

In the following there will be explained the function of the above-explained circuit.

When a person approaches the microscope and enters a predetermined detection range of the sensor 3 while the switch 5 is closed, said sensor 3 detects the presence of said person and shifts the output to the low-level ("L") state. In response the inverter U1 outputs a high (H) level output while the buffer U2 outputs an L-level output, whereby the transistors Q1 and Q4 are turned on while the transistors Q2 and Q3 are turned off. In this state a current flows in the direction A, from the transistor Q1 through the shutter 1 to the transistor Q4, thereby opening the shutter 1.

When the person leaves the microscope and steps out of the predetermined detection range of the sensor 3, it no longer detects the presence of said person and shifts the output to the H-level. In response the inverter U1 outputs an L-level output while the buffer U2 outputs an H-level output, whereby the transistors Q1 and Q4 are turned off while the transistors Q2 and Q3 are turned on. In this state a current flows in the direction B, from the transistor Q3 through the shutter 1 to the transistor Q2, thereby closing the shutter 1.

When the switch 5 is open, the shutter 1 is always closed since the output of the inverter U1 is at the L-level while that of the buffer U2 is at the H-level at any time.

It is also possible to constantly open the shutter 1 even when the switch is closed, by connecting the switch parallel to the sensor and grounding one of the terminals of the switch.

The sensor signal of the sensor 3 is outputted, when the switch 5 is closed, through the buffer 7 and the connector 8 of the signal output unit 6 to external equipment, for example peripheral equipment of the microscope or an illuminating light source device, separate from the microscope. Consequently devices other than the microscope can also be operated by said sensor signal.

The signal output unit 6 may also be branched between the sensor 3 and the switch 5.

In the following there will be explained a second embodiment of the present invention, with reference to FIGS. 2A and 2B. Parts same as or similar to those in the foregoing first embodiment will not be explained further. Also in FIGS. 2A and 2B, components equivalent in function to those in the first embodiment are represented by same reference designation.

Figure 2A:
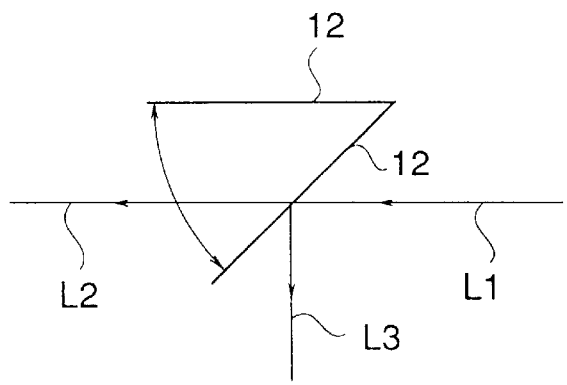
FIG. 2A is a view showing the optical path switching by a mirror in a second embodiment of the present invention.

FIG. 2A shows a mirror 12 for switching an optical path to a phototaking device and another optical path to an eyepiece lens. An optical path L1 from a specimen (not shown) is switched, by the mirror 12 rotated by a motor 13 (FIG. 2B), between a straight optical path L2 and a deflected optical path L3.

Figure 2B:
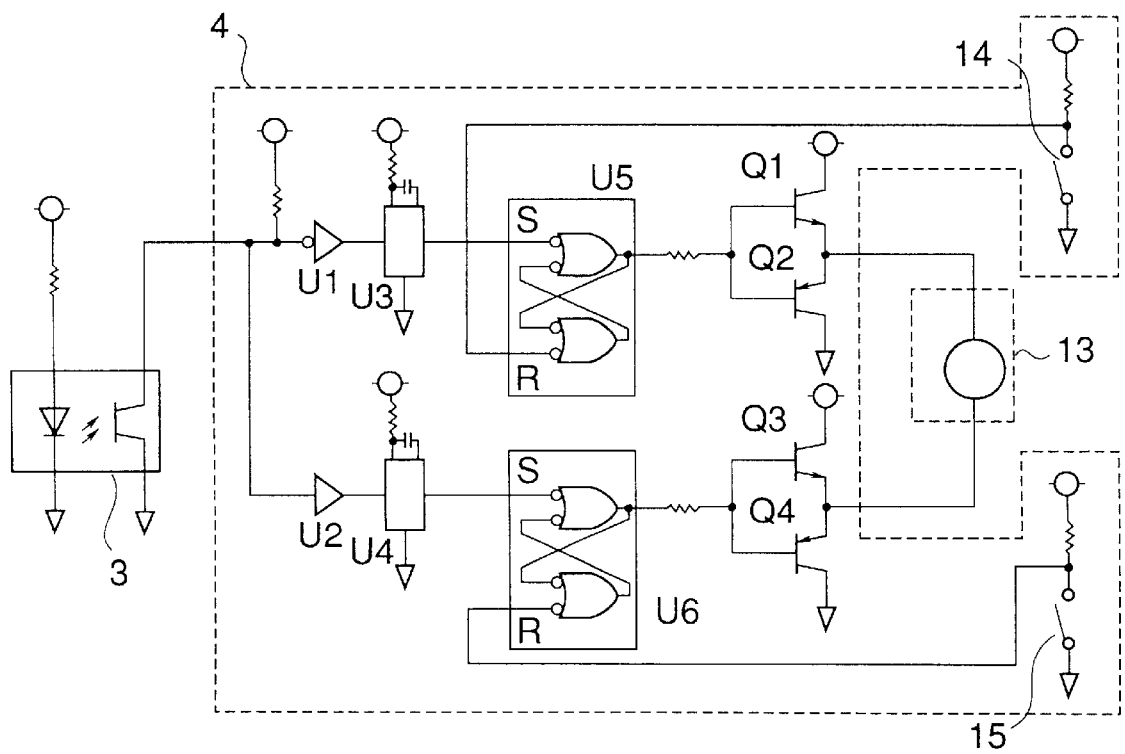
FIG. 2B is a block diagram of a second embodiment of the present invention.

Referring to FIG. 2B, a position detecting switch 14 is closed by the mirror 12 at a position for forming the optical path L2, and a position detecting switch 15 is closed by said mirror 12 at a position for forming the optical path L3.

A control unit 4 is composed of a serial connection of an inverter U1, a one-shot trigger U3, a flip-flop U5 and transistors Q1, Q2, and, in parallel, another serial connection of a buffer U2, a one-shot trigger U4, a flip-flop U6 and transistors Q3, Q4. The flip-flops U5, U6 are respectively connected to the switches 14, 15. Said one-shot triggers U3, U4 are composed of monostable multivibrators, each generating a single negative pulse of a predetermined duration (0.5 to 2 seconds) for moving the mirror 12 by the motor 13, at the upshift of an input signal.

When the output of the sensor 3 is shifted to the L-level by the approach of a person, the output of the inverter U1 changes from the L-level to the H-level while that of the buffer U2 is at the L-level. The one-shot trigger U3 outputs an L-level pulse of a predetermined duration at the upshift of the output of the inverter U1 from the L- to the H-level, but the one-shot trigger U4 does not output a pulse. The pulse outputted from the one-shot trigger U3 sets the flip-flop U5, thereby shifting the output thereof to the H-level. As the output of the flip-flop U6 remains at the L-level, a current flows from the transistor Q1, through the motor 13, to the transistor Q4, whereby the motor 13 is activated to rotate the mirror 12, thus connecting the optical path L2 to the optical path L1 and closing the switch 14. When the flip-flop U5 is reset by the closing of the switch 14, both outputs of the flip-flops U5, U6 assume the L-level so that the current no longer flows in the motor and the mirror 12 stops.

When the output of the sensor 3 is shifted to the H-level as the person moves away, the outputs of U1 to U6 are all inverted relative to the states explained above, whereby a current flows from the transistor Q3 through the motor 13 to the transistor Q2, and the motor 13 is rotated inversely. Thus the mirror 12 returns to the original position, whereby the optical path L3 is connected to the optical path L1 and the switch 15 is closed. When the flip-flop U6 is reset by the closing of the switch 15, both outputs of the flip-flops U5, U6 assume the L-level so that the current no longer flows in the motor 13 and the mirror 12 stops.

Figure 3:
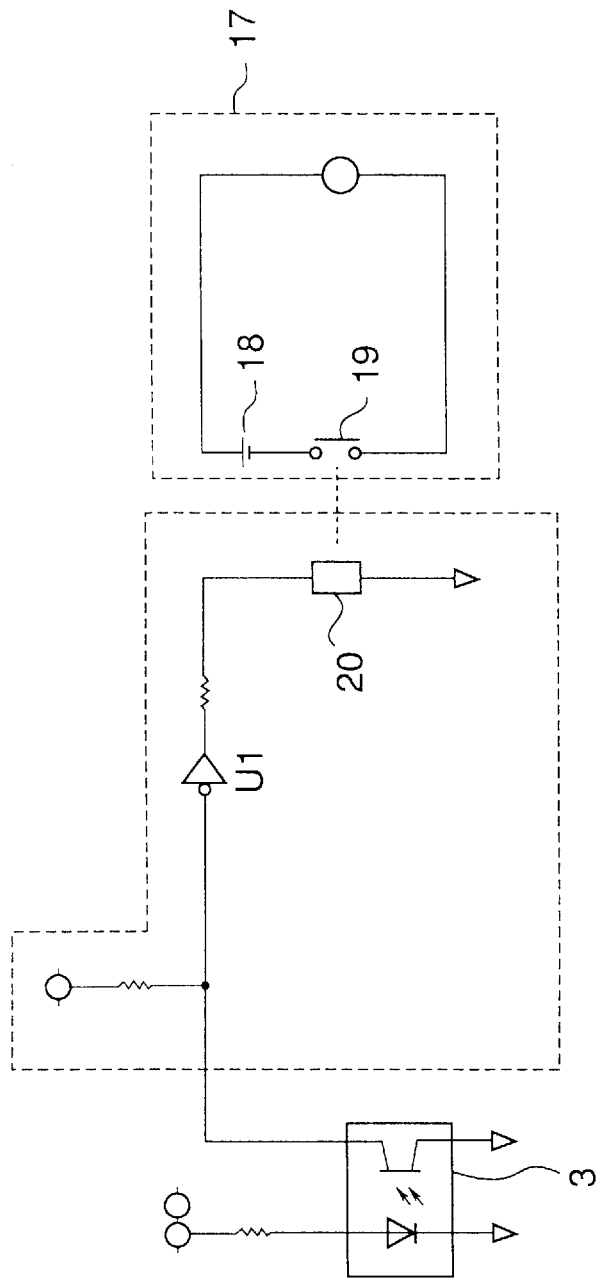
FIG. 3 is a block diagram of a third embodiment of the present invention.

Now there will be explained, with reference to FIG. 3, a third embodiment of the present invention, in which parts same as or similar to those in the first embodiment will not be explained further.

A lamp 17 is connected to a DC power source 18 and a relay switch 19.

When the output of the sensor 3 is shifted to the L-level by the approach of a person, the output of the inverter U1 is shifted from the L-level to the H-level whereby a current flows in a relay coil 20. Thus the relay switch 19 is opened and the lamp 17 is turned on.

When the output of the sensor 3 is shifted to the H-level as the person moves away, the output of the inverter U1 is shifted from the H-level to the L-level whereby the current no longer flows in the relay coil 20. Thus the relay switch 19 is opened and the lamp 17 is turned off.

Figure 4:
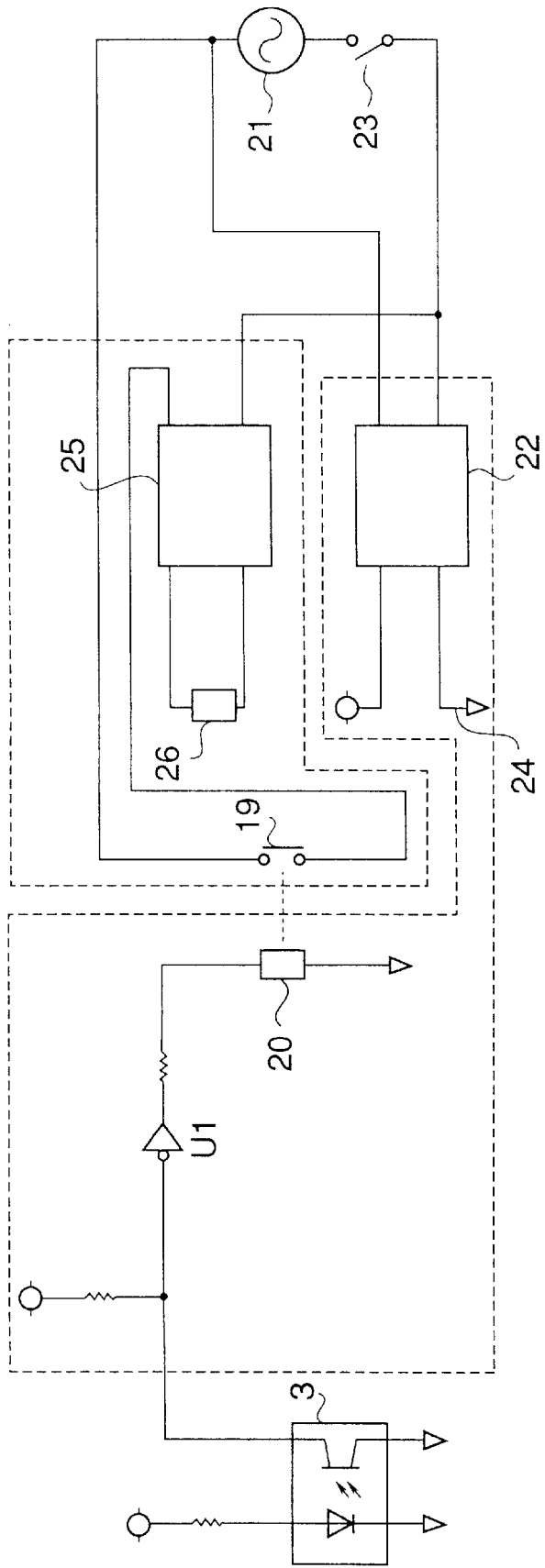
FIG. 4 is a block diagram of a fourth embodiment of the present invention.

Now there will be explained a fourth embodiment of the present invention with reference to FIG. 4, wherein parts same as or similar to those of the first embodiment will not be explained further.

To a main power source 21, there is connected a power supply circuit 22 through a main power switch 23, and said power supply circuit 22 constitutes the power source 24 for the sensor circuit. Also connected, to the main power source 21, is a power supply circuit 25 for electric power supply to a main load 26 such as the illuminating system.

The sensor 3 is activated when the electric power is supplied to the sensor circuit by the closing of the main power switch 23. When the output of the sensor 3 is shifted to the L-level by the approach of a person, the output of the inverter U1 is shifted from the L-level to the H-level, whereby a current flows in the relay coil 20. Thus the relay switch 19 is closed and the main load 26 is activated.

When the output of the sensor 3 is shifted to the H-level as the person moves away, the output of the inverter U1 is shifted from the H-level to the L-level, whereby the current no longer flows in the relay coil 20. Thus the relay switch 19 is opened and the main load 26 is deactivated.

Figure 5:
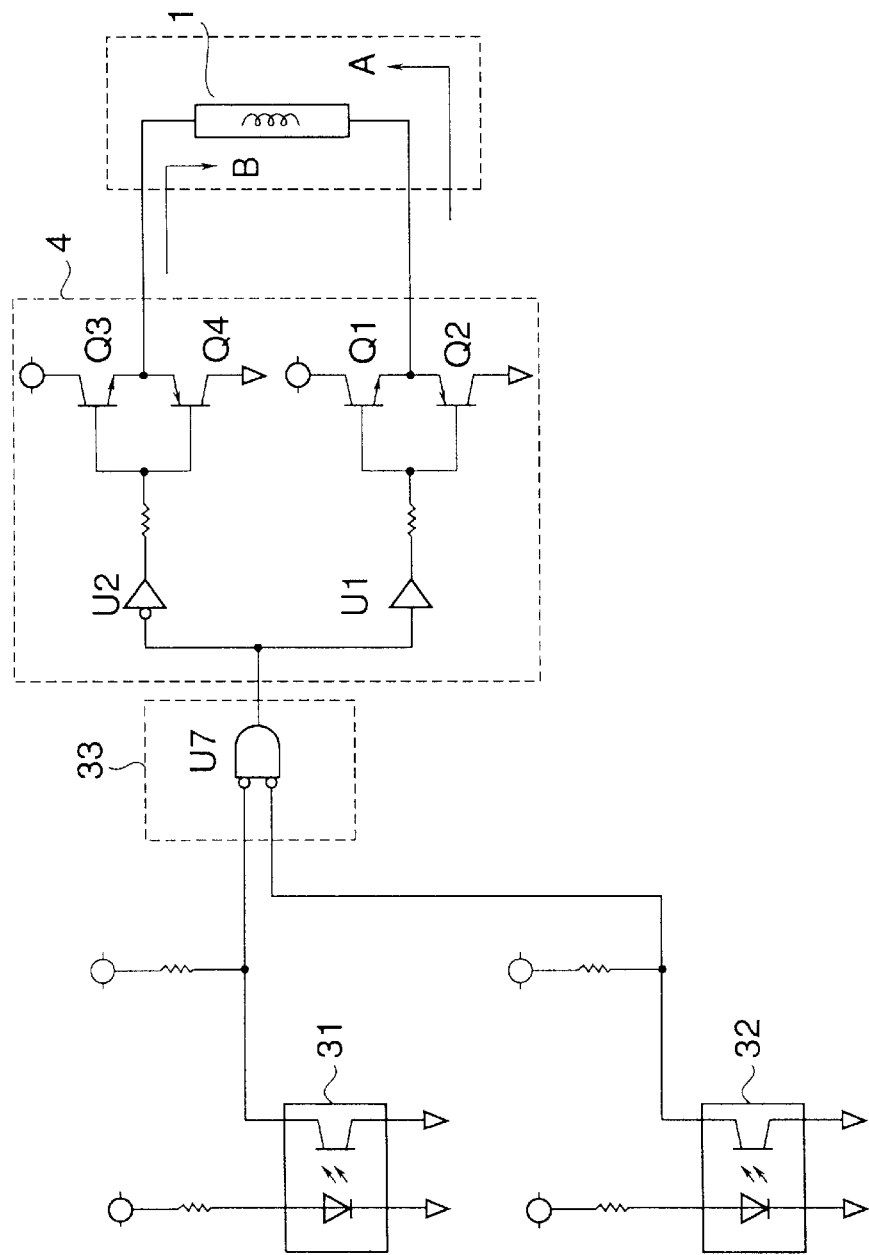
FIG. 5 is a block diagram of a fifth embodiment of the present invention.

Now there will be explained a fifth embodiment of the present invention with reference to FIG. 5. This embodiment is to open and close a shutter as in the first embodiment, and the explanations of the corresponding structure will be omitted.

Two sensors 31, 32 are connected, through an operation unit 33, to the control unit 4. Said operation unit 33 is composed of an AND circuit U7.

When a person approaches and is detected by both sensors 31, 32, the AND gate U7 receives L-level input signals to output an H-level output, whereby a current flows from the transistor Q1 through the shutter 1 to the transistor Q4, thereby opening said shutter 1. When the position of the person varies with respect to the sensors 31, 32 and either of the outputs of said sensors 31, 32 vary to the H-level, the shutter 1 is closed.

Two sensors can provide four detection states, i.e., a state of detection by both sensors, a state of detection by one of the sensors, a state of detection by the other and a state of no detection, so that the position of the observer can be detected in a more precise manner.

Also a switch may be provided between the sensors 31, 32 and the operation unit 33 or between the operation unit 33 and the control unit 4, and the signal output unit may be provided in front of the operation unit 33.

In the following there will be explained the positions of arrangement of the sensors.

Figure 6:
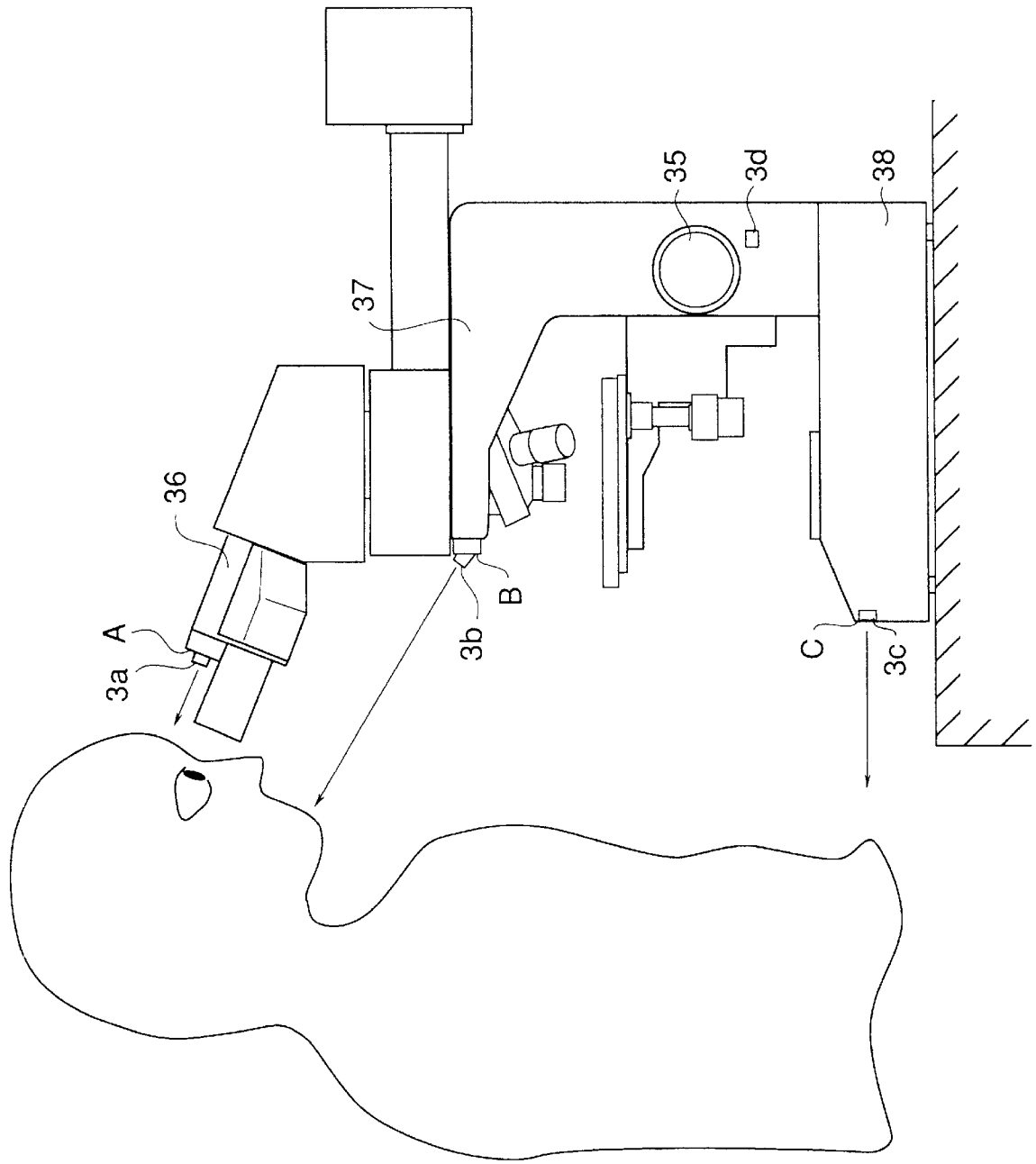
FIG. 6 is a view showing the arrangement of sensors of the present invention.

As shown in FIG. 6, a sensor 3a is provided at an upper position A of the eyepiece lens barrel 36, and detects the approach of the upper part of the face, around the forehead and including the eyes, of the observer. A sensor 3b is provided at a front end position B of a microscope arm 37, supporting the eyepiece lens barrel, and detects the central to lower part of the face of the observer. A sensor 3c is provided at a front position C of a microscope base 38 and detects the approach of the body of the observer to the microscope. There may also be selected other suitable positions. The sensor 3 in the first to fourth embodiments and the sensors 31, 32 in the fifth embodiment may be provided in any of the positions A, B and C shown in FIG. 6. In the following there will be explained an example of the positional relationship between the sensor and the member to be operated.

For example, in case the sensor of the second embodiment corresponds to the sensor 3a shown in FIG. 6, the switching of the optical path for the illuminating optical system can be achieved by said sensor 3a only.

Also if two sensors 3b, 3c are employed in the third embodiment and the operation circuit is so constructed that the power supply to the lamp is turned off only when both sensors are in the non-detection state, it is rendered possible to avoid unnecessary on/off operations of the power source even when the observer moves his face away from the microscope, such as for writing a note.

Also in case the sensor of the first embodiment corresponds to the sensor 3b in FIG. 6 and that of the fourth embodiment corresponds to the sensor 3c in FIG. 6, the illuminating light is irradiated to the specimen during the observation, but the shutter is closed when the observer moves the face away from the microscope, such as for writing a note, and the power supply of the microscope is turned off when the observer walks away from the microscope upon completion of the observation.

In addition to the foregoing embodiments, there may be provided, as shown in FIG. 6, a sensor 3d in the vicinity of a knob for vertically moving the stage. It is thus made possible to normally effect the vertical movement of the stage in the auto focusing mode, and to switch said movement to the manual operation mode when the sensor detects the hand of the observer, extended to manipulate the knob.

The circuits of the foregoing embodiments may also be realized by a microprocessor, and, in such case, an erroneous operation can be prevented even in case a person or an object merely passes in front of the microscope, by constructing the software in such a manner that the operation takes place only if the detection signal is outputted continuously for a predetermined period.

What is claimed is:

1. An automatic microscope comprising:

an operating member operated electrically;

a plurality of detectors provided on mutually different parts of the microscope for detecting presence of different parts of an observer, respectively each of said detectors including a light source for emitting light to a predetermined area around the microscope and a photosensor unit for receiving light from said light source that is reflected by the observer; and a control circuit for controlling operation of said operating member according to a combination of output signals from said detectors.

2. An automatic microscope having a first optical path for observing an image of a specimen and a second optical path different from said first optical path, comprising;

an optical path switching member for guiding light from the specimen to the first and second optical paths, selectively;

a driving member for driving said optical path switching member;

a detecting system for detecting presence of an observer in a predetermined area around the microscope and for outputting an output signal indicating the presence of the observer in or absence of the observer from said predetermined area; and a control circuit for controlling the driving member in response to said output signal so as to cause said optical path switching member to select the first optical path when the observer is present in said predetermined area, and to cause said optical path switching member to select the second optical path when the observer is absent from said predetermined area.

* * * * *